(12) United States Patent
D et al.

(10) Patent No.: US 12,346,473 B2
(45) Date of Patent: Jul. 1, 2025

(54) ADAPTIVE UPDATING OF DYNAMICALLY CHANGING ANALYTICAL MODEL

(71) Applicant: SAP SE, Walldorf (DE)

(72) Inventors: Sai Sunanda D, Bangalore (IN);
Devicharan Vinnakota, Bangalore (IN); Priyanka Kommanapalli, Bangalore (IN); Mohd Bilal, Lucknow (IN)

(73) Assignee: SAP SE, Walldorf (DE)

( * ) Notice: Subject to any disclaimer, the term of this patent is extended or adjusted under 35 U.S.C. 154(b) by 297 days.

(21) Appl. No.: 18/295,596

(22) Filed: Apr. 4, 2023

(65) Prior Publication Data

US 2024/0338475 A1  Oct. 10, 2024

(51) Int. Cl.
*G06F 21/62* (2013.01)
*G06F 21/60* (2013.01)

(52) U.S. Cl.
CPC ........ *G06F 21/6227* (2013.01); *G06F 21/604* (2013.01)

(58) Field of Classification Search
CPC ................. G06F 21/6227; G06F 21/604
See application file for complete search history.

(56) References Cited

U.S. PATENT DOCUMENTS

| 11,714,811 | B2* | 8/2023 | Levine | G06F 21/6218 707/770 |
| 2014/0337384 | A1* | 11/2014 | Ritter | G06F 21/6218 707/783 |
| 2020/0364266 | A1* | 11/2020 | Adinarayan | G06F 16/904 |
| 2022/0150125 | A1* | 5/2022 | Kumar | H04L 41/5054 |

* cited by examiner

*Primary Examiner* — Ayoub Alata
(74) *Attorney, Agent, or Firm* — Fountainhead Law Group, PC (57) ABSTRACT

Embodiments provide systems and methods that update analytical models which are changing over time. Upon receipt of a model creation request, a synchronization is performed to receive updated metadata reflecting a current state of a model. Where such updating indicates a change in status (e.g., privacy) of the model metadata, the user is prompted with a sensitive metadata field, and an empty context metadata field. The user must fill in the context metadata field (e.g., with an appropriate ID) thereby providing authorization to access data of the model. Then, a model view including sensitive information can be passed to the user. Absent successfully inputting the context metadata field, error message(s) are returned to the user, and the model view will not be passed. Embodiments may find particular use in efficiently updating analytical models to ensure their continuing compliance with evolving privacy regulation (e.g., ongoing revision and/or interpretation of GDPR language).

20 Claims, 9 Drawing Sheets

ADAPTIVE UPDATING OF DYNAMICALLY CHANGING ANALYTICAL MODEL

BACKGROUND

Unless otherwise indicated herein, the approaches described in this section are not prior art to the claims in this application and are not admitted to be prior art by inclusion in this section.

Maintaining the privacy of an individual's data stored in a computer system, is emerging as a concern for government regulators. For example, in Europe the ability to store and access certain types of data (e.g., age; disability status) of a private individual, is governed by the General Data Protection Regulation (GDPR).

The specific language of the GDPR itself, as well as interpretation of that language by courts, may change over time. The prompt and efficient updating of analytical models accessing and manipulating such private data, can be time-consuming and difficult.

SUMMARY

Embodiments provide systems and methods that update analytical models which are changing over time. Upon receipt of a model creation request, a synchronization is performed to receive updated metadata reflecting a current state of a model. Where such updating indicates a change in status (e.g., privacy) of the model metadata, the user is prompted with a sensitive metadata field, and an empty context metadata field. The user must fill in the context metadata field (e.g., with an appropriate ID) thereby providing authorization to access data of the model. Then, a model view including sensitive information can be passed to the user. Absent successfully inputting the context metadata field, error message(s) are returned to the user, and the model view will not be passed. Embodiments may find particular use in efficient updating of analytical models to ensure their continuing compliance with evolving privacy regulation (e.g., ongoing revision and/or interpretation of GDPR language).

The following detailed description and accompanying drawings provide a better understanding of the nature and advantages of various embodiments.

DETAILED DESCRIPTION

Described herein are methods and apparatuses that implement adaptive updating of dynamically changing models. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Software platforms may apply analytical models to data in order to obtain useful insights. Various forms of regulation (e.g., the GDPR), however, may prohibit users of analytical models from having access to personal data. Accordingly, embodiments provide systems and methods that update metadata analytical models.

Figure 1:
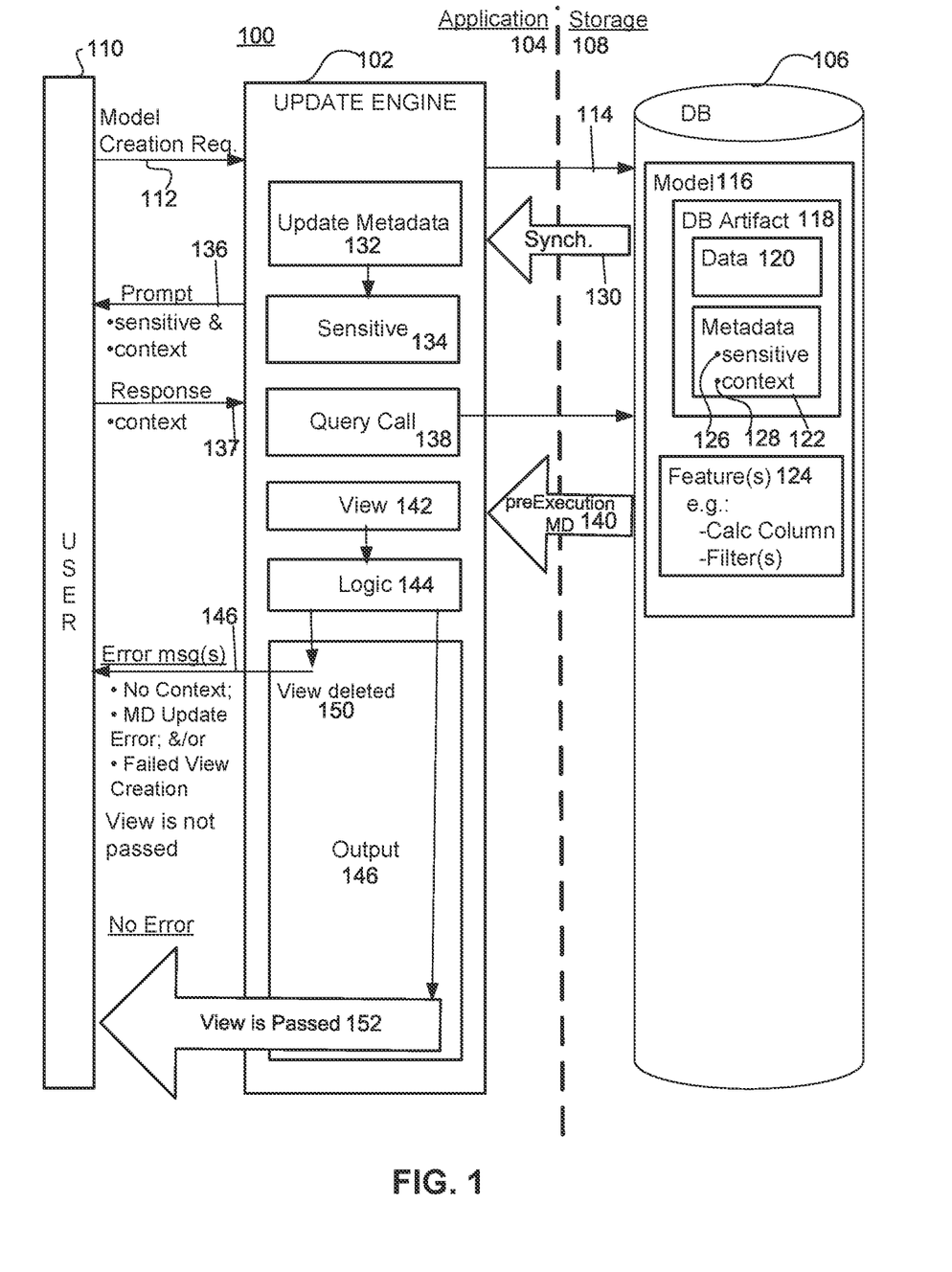
FIG. 1 shows a simplified diagram of a system according to an embodiment.

FIG. 1 shows a simplified view of an example system that is configured to implement model updating according to an embodiment. Specifically, system 100 comprises update engine 102 in application layer 104, that is in communication with a non-transitory computer readable storage medium 106 within a storage layer 108.

The update engine receives from user 110, a request 112 to create an analytical model. In certain embodiments, this request may be triggered by the user clicking a button to edit an existing model.

In response to the model creation request, then engine communicates a synchronization request 114 to the non-transitory computer readable storage medium. That storage medium has stored therein, an analytical model 116.

The analytical model comprises database artifact(s) 118 that include data 120 and metadata 122. The analytical model also comprises feature(s) 124, examples of which can include but are not limited to Calculated column(s) and/or filter(s).

The metadata may indicate certain types of data to be of a sensitive nature (e.g., private under the GDPR). Accordingly, the model includes sensitive metadata 126.

The model may also include metadata that indicates whether access to sensitive metadata is permitted. Such context metadata 128 can include a per-user and/or per-subject identifier(s) (IDs).

In response to the synchronization request, the storage medium returns 130 updated metadata 132 indicating a sensitive metadata field 134. Updated metadata may include change(s) reflecting newly sensitive data. For example, employee salary information may have been recently interpreted under the GDPR to impart an privacy obligation.

The updated metadata could also include change(s) that reflect revocation of data formerly deemed to be private. For example, employee salary information previously interpreted as being private under the GDPR, may now instead be construed as excluded from that regulation.

The update engine then presents to the user, the sensitive metadata field and a prompt 136 to fill in a corresponding context metadata field. In response 137 to the prompt, the user may or may not fill in the context metadata field (e.g., with an ID indicating authorization).

The engine then issues a query call 138 to the analytical model stored in a non-transitory computer readable storage medium. In response to the query call, the engine receives from the analytical model, pre-execution metadata 140 that is part of a view 142 including sensitive data according to feature(s) according to the model.

Then, the update engine executes logic 144 upon the view, based upon inputs received (or not received) from the user. (Details regarding sample logic according to an example, are shown and discussed below in connection with FIGS. 4-4C.) Thus where the user has not filled in the context field, the logic instructs the engine to provide an output 146 in the form of an error message 148.

Under such error conditions, the logic may instruct that the view including the sensitive data, not be passed to the user. The logic may also instruct that the view be deleted 150 (e.g., as shown in FIG. 4A).

It is noted that errors in addition to a user's failure to provide context metadata, may arise. Thus, according to the logic the engine may provide to the user with other types of error messages, e.g.: failure to update metadata and/or failure of view creation.

However, under other conditions, the view includes sensitive updated metadata, and in response to the prompt the user has in fact provided the appropriate context metadata. If no other errors are indicated, the update engine passes 152 the view to the user.

Figure 2:
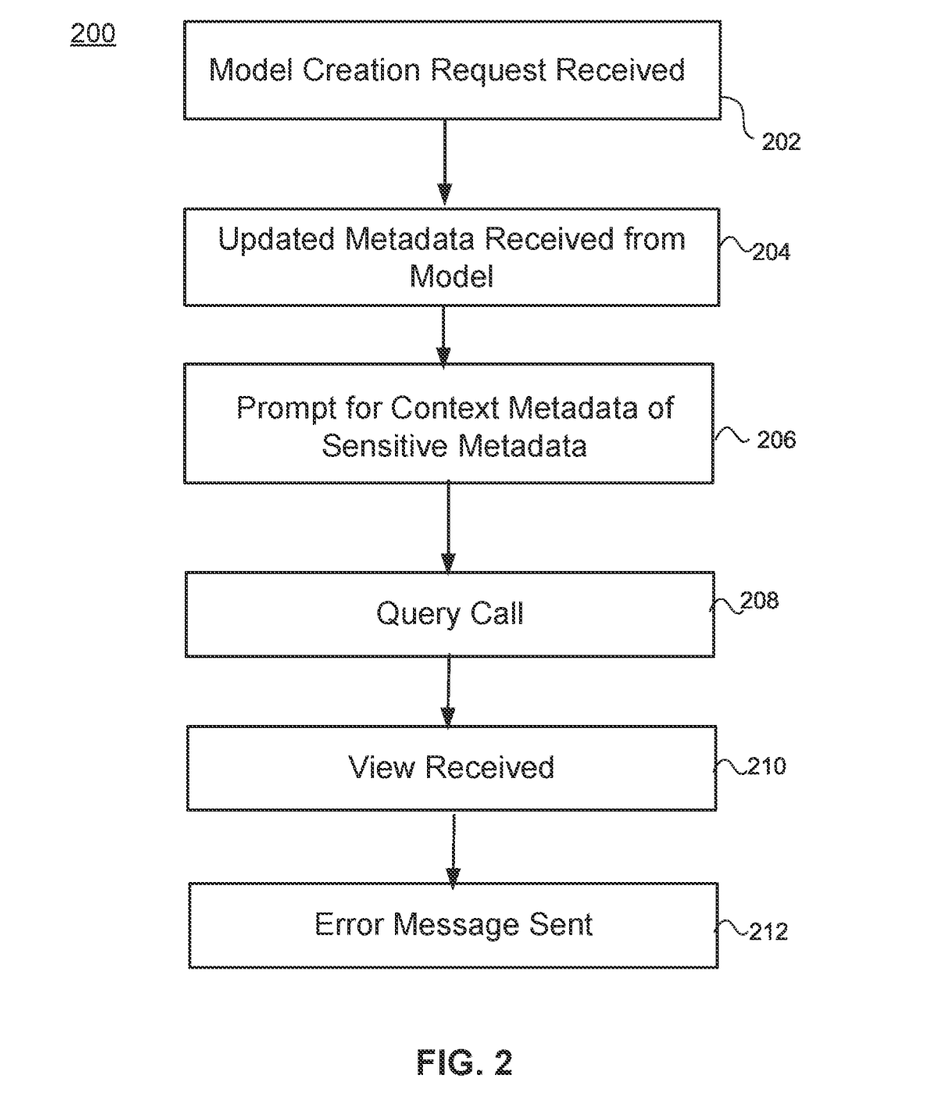
FIG. 2 shows a simplified flow diagram of a method according to an embodiment.

FIG. 2 is a flow diagram of a method 200 according to an embodiment. At 202, a model creation request is received.

At 204, in response to the model creation request, updated metadata indicating a sensitive metadata field is received from a non-transitory computer readable storage medium storing a model.

At 206, the sensitive metadata field and a prompt to fill in a corresponding context metadata field are provided.

At 208, a query call is made to the analytical model stored in the non-transitory computer readable storage medium. At 210, in response to the query call a view is received from the analytical model, the view including sensitive data according to the feature.

At 212 logic is applied, such that where the context field has not been filled in, an error message is sent (and the view is not passed).

Further details regarding adaptive model updating according to various embodiments, are now provided in connection with the following example. In this particular example, model updating is implemented in connection with an analytical model processing framework comprising the following available from SAP SE, of Walldorf, Germany:
- the SAP Cloud (SAC), including the Quality Validation Tool (QVT);
- the Intelligent Enterprise Suite (IES); and
- the SuccessFactors (sfsf) platform.

EXAMPLE

Business Intelligence (BI) applications such as SAC, may be tasked with handling data that is the subject of privacy regulation under the GDPR. For example, SAC could be used to access an analytical model that manipulates potentially sensitive, personally-identifiable fields such as:
- age,
- ethnicity,
- disability status, and
- others.

Language of the GDPR itself, and/or interpretation of GDPR language by courts, is not static and may evolve over time. For one very simple example, GDPR might have been initially interpreted to not specifically impose privacy obligations upon employee salary information. Later on, however, GDPR could be amended and/or interpreted to specifically impose an obligation to maintain the privacy of such employee salary information.

When such changes do occur, it is incumbent upon SAC to recognize and apply privacy regulations to stored (e.g., salary) data manipulated by the analytical model, so as to avoid providing access to private data without proper authorization. However, manually implementing such updates can be time-consuming and costly (e.g., requiring manual identification and blocking of stored salary information).

The instant example describes an embodiment where new metadata changes in a model, are synchronized with a current analytical model, without requiring substantial involvement of the user. Moreover, according to this exemplary embodiment, creation of an (updated) model is automatically blocked when the user does not indicate proper authorization (e.g., an appropriate context field) at runtime.

Figure 3:
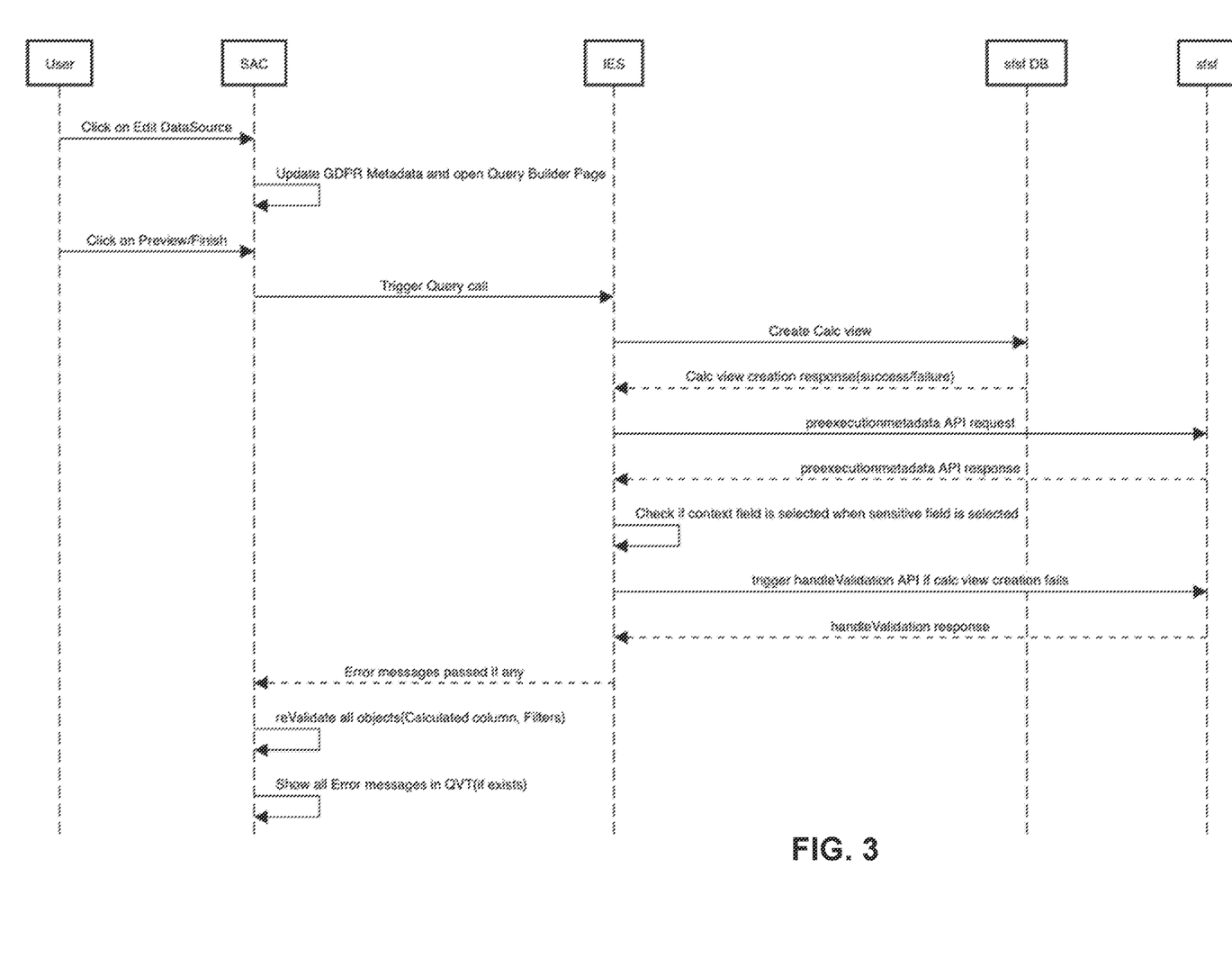
FIG. 3 shows a diagram depicting model updating according to an example embodiment.

FIG. 3 shows a simplified flow diagram illustrating the updating of sensitive field metadata and context field metadata. Creation of an analytical model is blocked when a context field is not selected by a user.

Here, the latest metadata is fetched by IES from the source comprising Lines of Business (LoBs)—e.g., sfsf. That latest metadata is synchronized with the existing analytical model, and all objects used thereby are validated in order to prevent unauthorized access to any (newly) restricted GDPR data.

After synchronization, the presence of the context field in the model is checked in the respective sensitive field. The user is restricted from proceeding if that context field is not present.

To achieve this, an API call is made to the LoB to obtain the information about the updated GDPR fields before the query is created. The response to the LoB call is used to validate whether context field is selected.

Each sensitive field will have a respective context field, that is to be selected in order for the analytical model creation to be successful. Where that context field is not selected, the query is failed. A corresponding error message may be indicated in the QVT.

As an example, a user may seek to create an analytical model with SAC using feature(s)—such as Calculate column and/or filter. However, that model may reference a field (e.g., salary) that has been newly updated to sensitive, without the user selecting the corresponding context field (e.g., User ID or Candidate ID). In that case, the embodiment will restrict creation of the analytical model, protecting the data of the business user.

Figure 4:
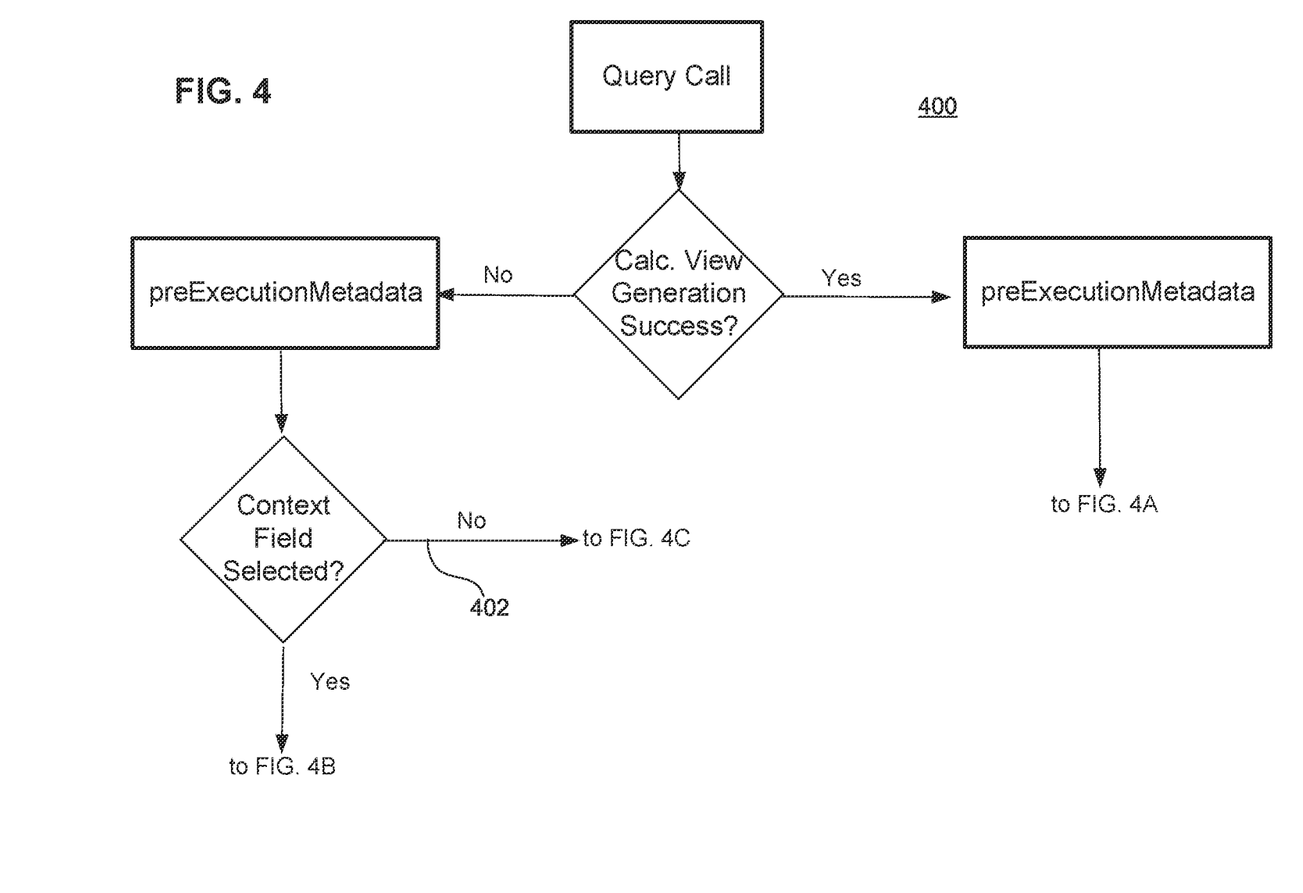
FIGS. 4-4C show a workflow according to the example.
Figure 4A:
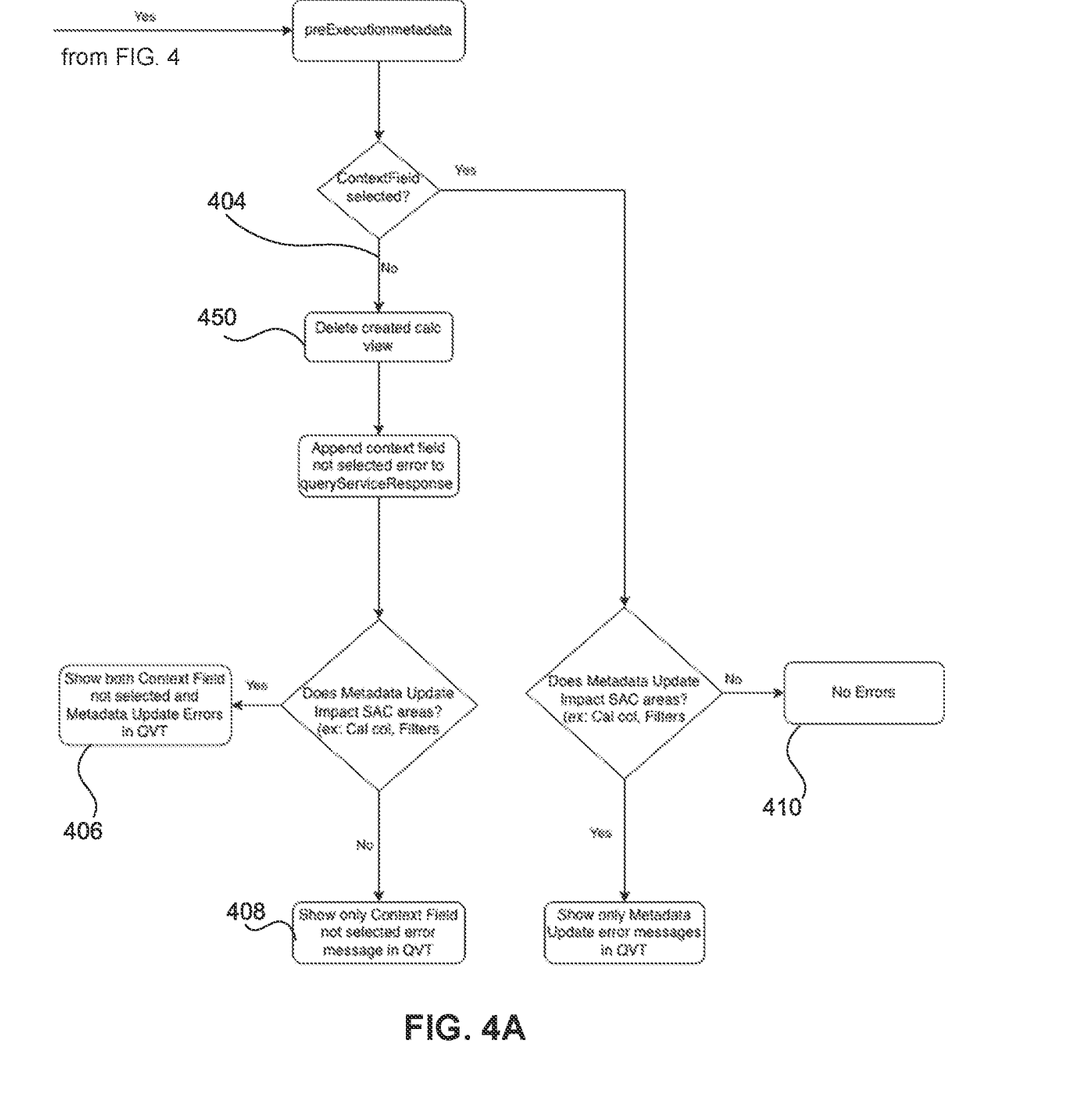
Figure 4B:
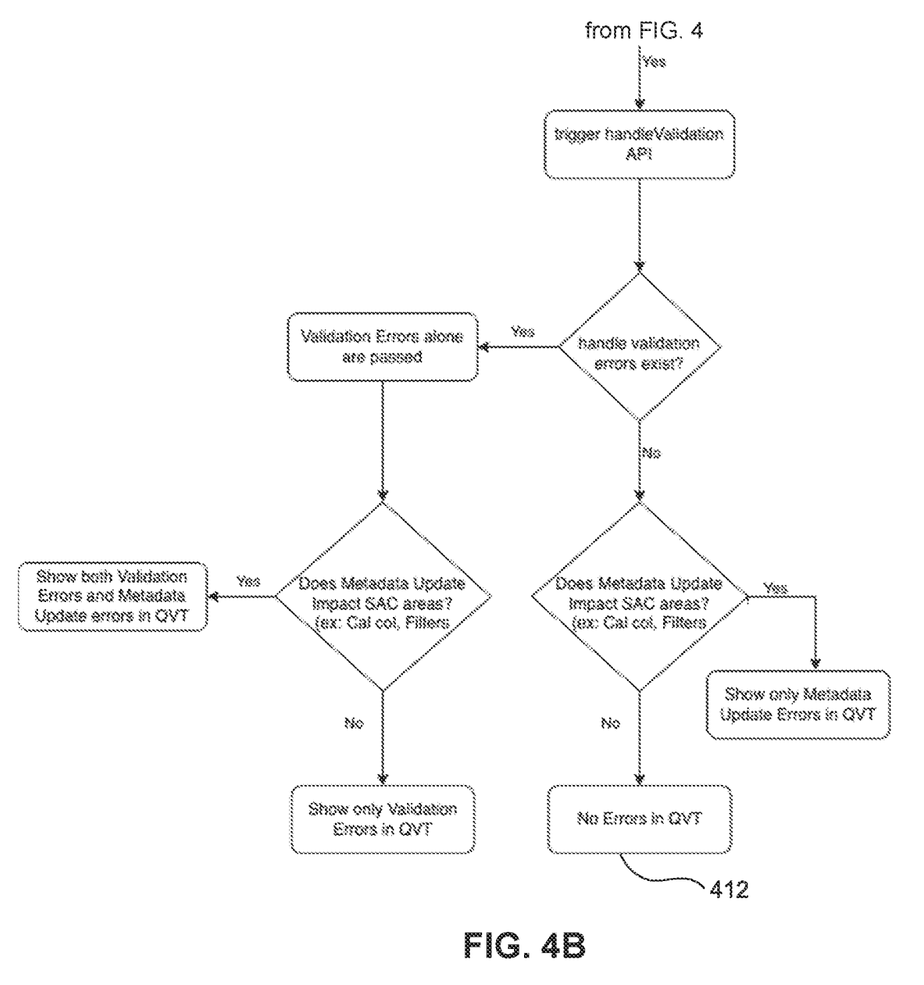
Figure 4C:
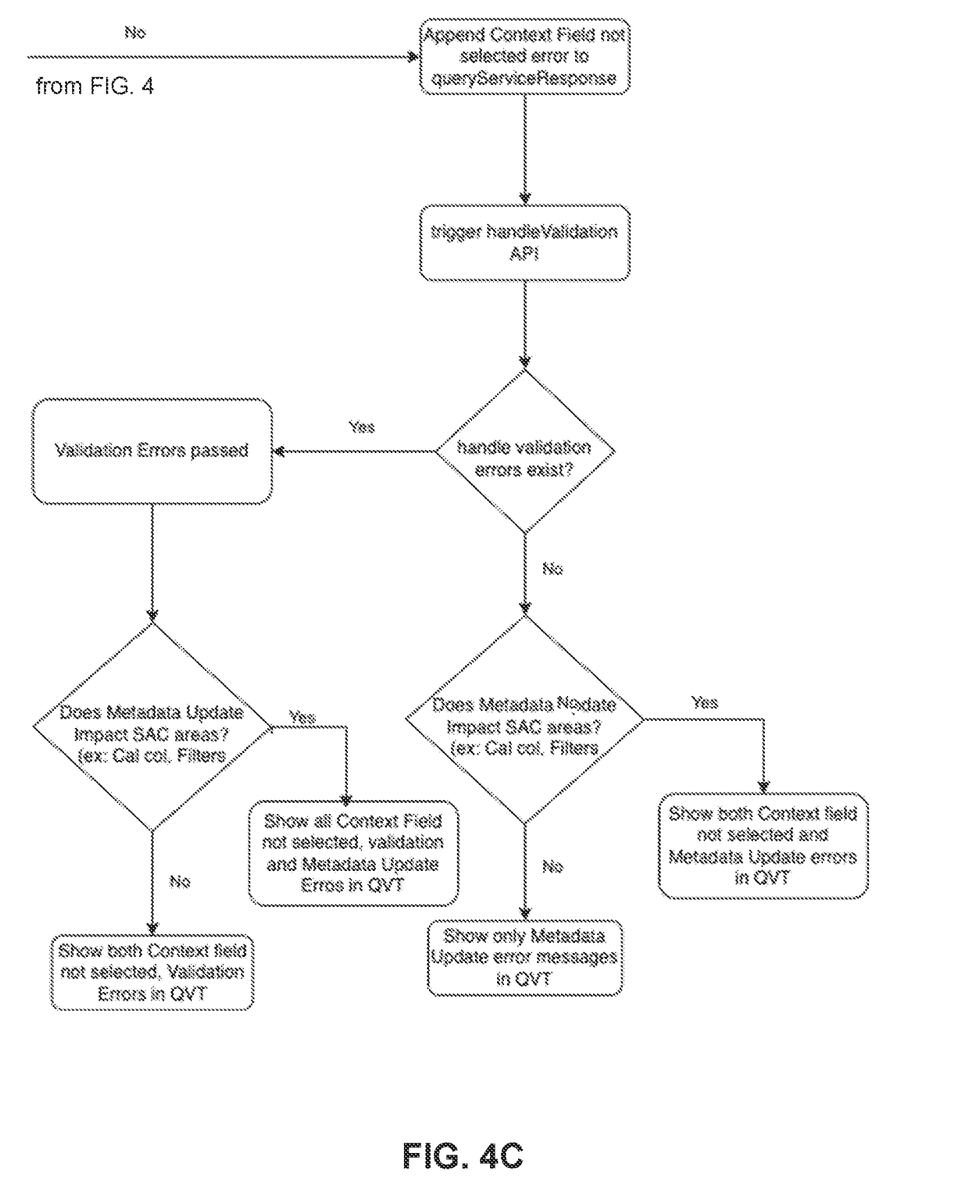

FIGS. 4-4C show a workflow 400 depicting various possible outcomes of adaptive model updating according to the example. Initially, the user creates a Report/Story using an analytical model that references DB artifacts.

After a certain amount of time, changes in metadata occur in those DB Artifacts. For example, the metadata of the DB artifact "salary" may change to indicate a newly recognized obligation under GDPR to maintain the privacy of salary information.

The user opens the Report/Story after the certain amount of time has passed. Upon editing the data source, the latest sensitive field metadata is automatically synchronized and updated, without the need for extensive intervention by the user.

According to this exemplary embodiment, existing objects will be validated to look for any attempted access to GDPR restricted information.

During the Analytical model creation, Application Programming Interface (API) calls will be triggered to LoBs to fetch the latest metadata. That latest metadata contains the GDPR information regarding sensitive fields and their respective context fields.

It is verified whether any of the selected columns in the Analytical model being created, are sensitive using the information obtained from the LoBs. In such scenarios, it is cross-checked that the respective context field is also part of the model.

If the context field is not selected by the user (e.g., 402; 404), an error indicating such will be provided in QVT to the user. The error will state that the specific context field is not selected (see outcomes 406; 408 in FIG. 4A, as well as all outcomes in FIG. 4C). Under these circumstances, no data that is private under GDPR will be passed to the user.

Where a calculation view is successfully generated, but a context field is not filled in by a user, the calculation view is deleted. This is shown at 450 in FIG. 4A.

The user can also re-select the sensitive field. This in turn will auto-select the context field before proceeding with the model creation.

In some cases, updated metadata will be part of data impacted by SAC features—e.g., Calculated column(s); particular filter(s). Under these circumstances, the data from the model is free to be revealed and no corresponding error need be shown (see, e.g., outcome 410 of FIG. 4A; outcome 412 of FIG. 4B).

Other outcomes in FIGS. 4A-4C indicate that an issue with model updating and/or validation has arisen. Accordingly, corresponding error message(s) are shown in QVT to the user, and the data cannot be passed on.

Updating of an analytical model according to various embodiments may offer one or more benefits. Specifically, one possible benefit is seamless operation. For example, when the BOE report is edited, the updated GDPR metadata at the DB Artifact level is automatically synchronized, without requiring extensive involvement by the user.

Another possible benefit is more robust operation. That is, validation is performed at the time of creating the analytical model itself, thereby verifying the sensitive and context field selection.

Still another possible benefit is enhanced notification to the user. In particular, the user will be prompted that context field is not selected. Then, the user will not be permitted to proceed further until this situation is remedied and the context field is also selected.

Returning now to FIG. 1, there the particular embodiment is depicted with the update engine as being located outside of the database. However, this is not required.

Rather, alternative embodiments could leverage the processing power of an in-memory database engine (e.g., the in-memory database engine of the HANA in-memory database available from SAP SE), in order to perform one or more various functions as described above.

Figure 5:
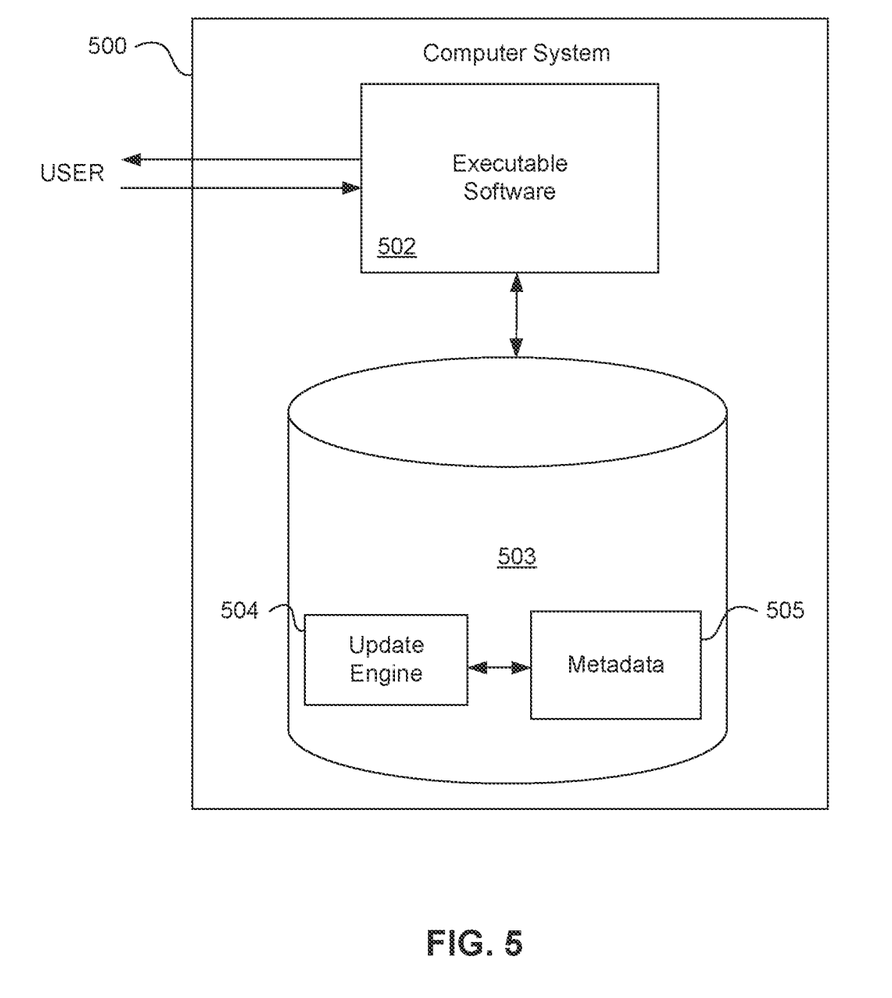
FIG. 5 illustrates hardware of a special purpose computing machine configured to implement adaptive model updating according to an embodiment.

Thus FIG. 5 illustrates hardware of a special purpose computing machine configured to perform model updating according to an embodiment. In particular, computer system 500 comprises a processor 502 that is in electronic communication with a non-transitory computer-readable storage medium comprising a database 503. This computer-readable storage medium has stored thereon code 505 corresponding to an update engine. Code 504 corresponds to metadata. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1. Computer implemented system and methods comprising:
 receiving a model creation request;
 in response to the model creation request, receiving from an analytical model, updated metadata indicating a sensitive metadata field;
 presenting the sensitive metadata field and a prompt to fill in a corresponding context metadata field;
 issuing a query call to the analytical model stored in a non-transitory computer readable storage medium, the analytical model comprising a feature;
 in response to the query call, receiving a view from the analytical model, the view including sensitive data according to the feature; and
 where the context field is not filled in, issuing an error message and not passing the view including the sensitive data.

Example 2. The computer implemented systems or methods of Example 1 wherein the sensitive metadata field indicates privacy data.

Example 3. The computer implemented system or method of Example 2 wherein the privacy data is based upon the General Data Protection Regulation (GDPR).

Example 4. The computer implemented system or method of Examples 1, 2, or 3 further comprising:
 in response to the prompt, receiving valid context data; and
 passing the view including the sensitive data.

Example 5. The computer implemented system or method of Example 4 wherein the valid context data comprises an identifier.

Example 6. The computer implemented system or method of Examples 1, 2, 3, 4, or 5 further comprising deleting the view where the context field is not filled in.

Example 7. The computer implemented system or method of Examples 1, 2, 3, 4, 5, or 6 wherein the feature comprises a filter or a calculated column.

Example 8. The computer implemented system or method of Examples 1, 2, 3, 4, 5, 6, or 7 further comprising:
 sending an Application Programming Interface (API) call; and the view is received in response to the API call.

Example 9. The computer implemented system or method of Examples 1, 2, 3, 4, 5, 6, 7, or 8 wherein:
 the non-transitory computer readable storage medium comprises an in-memory database; and
 an in-memory database engine of the in-memory database generates the view.

Figure 6:
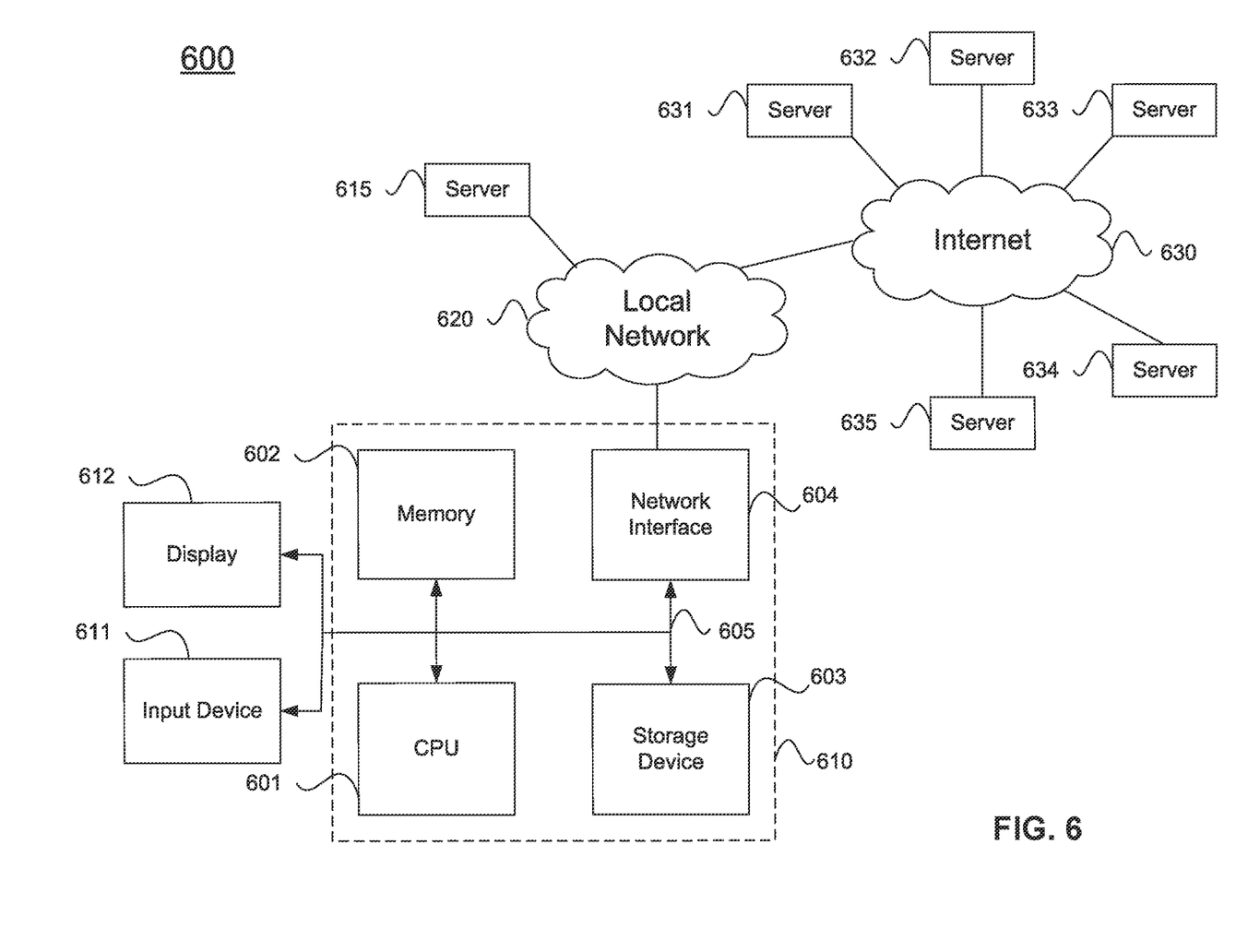
FIG. 6 illustrates an example computer system.

An example computer system 600 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a Light Emitting Diode (LED) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
   receiving a model creation request;
   in response to the model creation request, receiving from an analytical model, updated metadata indicating a sensitive metadata field;
   presenting the sensitive metadata field and a prompt to fill in a corresponding context metadata field;
   issuing a query call to the analytical model stored in a non-transitory computer readable storage medium, the analytical model comprising a feature;
   in response to the query call, receiving a view from the analytical model, the view including sensitive data according to the feature; and
   where the context metadata field is not filled in, issuing an error message and not passing the view including the sensitive data.

2. The method as in claim 1 wherein the sensitive metadata field indicates privacy data.

3. The method as in claim 2 wherein the privacy data is based upon the General Data Protection Regulation (GDPR).

4. The method as in claim 1 further comprising: in response to the prompt, receiving valid context data; and passing the view including the sensitive data.

5. The method as in claim 4 wherein the valid context data comprises an identifier.

6. The method as in claim 1 further comprising deleting the view where the context metadata field is not filled in.

7. The method as in claim 1 wherein the feature comprises a filter or a calculated column.

8. The method as in claim 1 further comprising: sending an Application Programming Interface (API) call; and the view is received in response to the API call.

9. The method as in claim 1 wherein: the non-transitory computer readable storage medium comprises an in-memory database; and an in-memory database engine of the in-memory database generates the view.

10. A non-transitory computer readable storage medium embodying a computer program for performing a method, said method comprising:
    receiving a model creation request;
    in response to the model creation request, receiving from an analytical model, updated metadata indicating a sensitive privacy metadata field;
    presenting the sensitive privacy metadata field and a prompt to fill in a corresponding context metadata field;
    issuing a query call to the analytical model stored in a non-transitory computer readable storage medium, the analytical model comprising a feature;
    in response to the query call, receiving a view from the analytical model, the view including sensitive privacy data according to the feature; and
    where the context metadata field is not filled in, issuing an error message and not passing the view including the sensitive privacy data.

11. The non-transitory computer readable storage medium as in claim 10 wherein the method further comprises: in response to the prompt, receiving valid context data; and passing the view including the sensitive privacy data.

12. The non-transitory computer readable storage medium as in claim 11 wherein the valid context data comprises a user identifier.

13. The non-transitory computer readable storage medium as in claim 10 wherein the feature comprises a filter or a calculated column.

14. The non-transitory computer readable storage medium as in claim 10 wherein the method further comprises deleting the analytical model where the context metadata field is not filled in.

15. A computer system comprising:
    one or more processors;
    a memory coupled to the one or more processors;
    a software program, executable on said computer system, the software program configured to cause an in-memory database engine of an in-memory database to:

receive a model creation request;

in response to the model creation request, receive from an analytical model stored in the in-memory database, updated metadata indicating a sensitive metadata field;

presenting the sensitive metadata field and a prompt to fill in a corresponding context metadata field;

issuing a query call to the analytical model stored in the in-memory database, the analytical model comprising a feature;

in response to the query call, receive a view from the analytical model, the view including sensitive data according to the feature; and where the context metadata field is not filled in, issue an error message and not pass the view including the sensitive data.

16. The computer system as in claim 15 wherein the in-memory database engine is further configured to: receive, in response to the prompt, valid context data; and then pass the view including the sensitive data.

17. The computer system as in claim 16 wherein the valid context data comprises a user identifier.

18. The computer system as in claim 15 wherein the in-memory database engine is further configured to delete the view when the context metadata field is not filled in.

19. The computer system as in claim 15 wherein the sensitive metadata field indicates privacy data.

20. The computer system as in claim 15 wherein the feature comprises a filter or a calculated column.

* * * * *